US006411729B1

(12) United States Patent
Grunkin

(10) Patent No.: US 6,411,729 B1
(45) Date of Patent: Jun. 25, 2002

(54) METHOD OF ESTIMATING SKELETAL STATUS

(75) Inventor: Michael Grunkin, Copenhagen (DK)

(73) Assignee: Torsana Osteoporosis Diagnostics A/S, Vedbaek (DK)

( * ) Notice: Subject to any disclaimer, the term of this patent is extended or adjusted under 35 U.S.C. 154(b) by 0 days.

(21) Appl. No.: 09/180,021
(22) PCT Filed: May 6, 1997
(86) PCT No.: PCT/DK97/00208

§ 371 (c)(1),
(2), (4) Date: Oct. 30, 1998

(87) PCT Pub. No.: WO97/42602

PCT Pub. Date: Nov. 13, 1997

(30) Foreign Application Priority Data

May 6, 1996 (DK) .............................................. 0540/96

(51) Int. Cl.$^7$ ................................................ G06K 9/40
(52) U.S. Cl. .................. 382/132; 382/128; 364/413.15; 128/660.01; 600/407
(58) Field of Search .......................... 364/413; 382/132, 382/128; 433/174; 128/660; 600/407

(56) References Cited

U.S. PATENT DOCUMENTS

| | | | | |
|---|---|---|---|---|
| 4,903,203 A | * | 2/1990 | Yamashita et al. | 364/413 |
| 4,941,474 A | * | 7/1990 | Pratt, Jr. | 128/660 |
| 5,247,934 A | | 9/1993 | Wehrli et al. | 600/410 |
| 5,319,549 A | * | 6/1994 | Katsuragawa et al. | 364/413 |
| 5,331,550 A | * | 7/1994 | Stafford et al. | 364/413 |
| 5,343,390 A | | 8/1994 | Doi et al. | 382/132 |
| 5,384,865 A | * | 1/1995 | Loveridge | 382/54 |
| 5,628,630 A | * | 5/1997 | Misch et al. | 433/174 |
| 5,915,036 A | | 6/1999 | Grunkin et al. | 382/132 |
| 5,931,780 A | * | 8/1999 | Giger et al. | 600/407 |

FOREIGN PATENT DOCUMENTS

| | | | |
|---|---|---|---|
| EP | 0648467 | 4/1995 | G06K/9/00 |
| WO | WO 9607161 | 3/1996 | |

OTHER PUBLICATIONS

Wil. G.M. Geraets et al., "A New Method for Automatic Recognition of the Radiographic Trabecular Pattern," Journal of Bone and Mineral Research, vol. 5, No. 3, 1990, pp. 227–233.

(List continued on next page.)

Primary Examiner—Leo Boudreau
Assistant Examiner—M. B. Choobin

(57) ABSTRACT

A method for estimating the skeletal status or bone quality of a vertebrate on the basis of two-dimensional image data comprising information relating to the trabecular structure of at least a part of a bone of the vertebrate, the image data being data obtained by exposing at least the part of the bone to electromagnetic radiation, such as X-rays, the method comprising subjecting the image data to a statistical analysis comprising a background correction procedure in which low frequency intensity variations not related to the trabecular structure of the bone are reduced relative to image data related to the trabecular structure of the part of the bone, a feature extraction procedure comprising (a) determining values reflecting the projected trabecular density in the image data, caused by the X-ray attenuating properties of cancellous bone in the part of the bone, for each of a number of locations or areas in the image data, (b) deriving one or more features from the variation of the determined PTD-values, preferably in the longitudinal direction of the bone, and an estimation procedure in which the skeletal status of the vertebrate is estimated on the basis of the one or more derived features and optionally other features related to the bone of the vertebrate and a predetermined relationship between the features and reference skeletal status parameters. Preferably, a profile describing the projected trabecullar density as a function of the distance along a line substantially at the center of the bone is determined, and information relating to skeletal status is derived from variations, fluctuations or other features of the profile.

37 Claims, 4 Drawing Sheets

OTHER PUBLICATIONS

Robert S. Weinstein et al., "Fractal Geometry and Vertebral Compression Fractures," Journal of Bone and Mineral Research, vol. 9, No. 11, 1994, pp. 1797–1802.

Sharmila Majundar et al., "Application of fractal geometry techniques to the study of trabecular bone," Med. Phys. 20 (6), Nov/Dec 1993, pp. 1611–1619.

C.L. Benhamou et al., "Fractal Organization of Trabecular Bone Images on Calcaneus Radiographs," Journal of Bo and Mineral Research, vol. 9, No. 12, 1994, pp. 1909–1918.

Donatella Trippi et al., "A Computer–Assisted Method for the Study of the Trabecular Bone of the Distal Radius on Conventional Radiographs," Journal of Digital Imaging, vol. 6, No. 2, May, 1993, pp. 140–147.

Masao Fukunaga et al., "Indexes of Bone Mineral Content on Second Metacarpal Bone Roentgenogram Analyzed by Digital Image Processing: A Comparison with Other Bone Mass Quantifying Methods," Radiation Medicine, vol. 8, No. 6, 1990, pp. 230–235.

William S. Cleveland, "Robust Locally Weighted Regression and Smoothing Scatterplots", Journal of the American Statistical Association, Dec. 1979, vol. 74, No. 368, Theory and Methods Section, pp. 829–836.

Jens Michael Carstensen, "Description and Simulation of Visual Texture," Ph.D. Thesis, Technical University of Denmark, IMM. Bldg. 321, DK–2800 Lyngby, Denmark, 1992.

Image Processing, Analysis and Machine Vision, (10 pages).

On The Fractal Nature of Trabecular Structure, Oct. 1994 (pp. 1535–1540).

16. NIH/NIA & NIAMS–Aging and Bone Quality (10 pages).

Cancellous Bone Structure: Analysis of High–Resolution CT Images with the Run–Length Method (pp. 133–139).

* cited by examiner

METHOD OF ESTIMATING SKELETAL STATUS

This application claims the benefit under 35 U.S.C. §371 of prior PCT International Application No. PCT/DK97/00208 which has an International Filing date of May 6, 1997 which designated the United States of America, the entire contents of which are hereby incorporated by reference.

FIELD OF THE INVENTION

The present invention relates to a method for estimating aspects of the bone quality or skeletal status of a vertebrate on the basis of two-dimensional image data comprising information relating to the trabecular structure of at least a part of a bone, typically a long or tubular bone. Especially bones comprising a tube (diaphysis) and at least at one end an epiphysis comprising trabecular bone are suitable for use in the present method.

In the present context, skeletal status is taken to relate to e.g. biomechanical competence, trabecular homogeneity, cortical thickness of the bone or a quantification of sensitivity, specificity or accuracy of diagnosis of osteoporosis.

DESCRIPTION OF RELATED ART

Age, or more likely co-variates with age, such as e.g. risk of falling, the type of falls and skeletal status, significantly affects fracture risk. Hence, any type of BMD must be viewed only as an index of risk. However, when age-matched individuals with and without fractures are compared, an overlap in BMD measurements is apparent. It is contemplated that this, in part, is due to the fact that important skeletal properties, such as trabecular connectivity (or homogeneity), is largely ignored by BMD measurements, since small losses in cancellous bone mass may lead to a disproportinately large loss in biomechanical competence.

The surface area of cancellous bone is greater than that of cortical bone, even though cancellous bone may occupy only 25% of the skeletal mass of a healthy individual and as little as 10% of that of an osteoporotic patient. Because of the high surface-to-volume ratio of cancellous bone tissue, osteoporosis is thought to affect trabecular sites early in the disease process. In postmenopausal osteoporosis, there is a marked loss of trabecular elements, but little evidence of actual trabecular thinning. The loss of elements is thought to be a result of cavities that transect or perforate structures. This is thought to have important implications for skeletal strength, and hence for those components of fracture risk related to skeletal strength.

Currently, the connectivity of cancellous bone can be measured reliably only by invasive techniques or by the technique described in the Applicants co-pending International application No. PCT/DK95/00338.

In U.S. Pat. No. 4,903,203, a method of positioning an ROI in a bone is disclosed. In this reference, only a single ROI is determined, mined, and no variance of PTD is mentioned.

In EP-A-0 648 467, different methods are disclosed wherein BMD is evaluated in a distal radius. In order to evaluate the method herein, BMD was investigated at different positions along the length of the bone. However, the actual method of this reference relates to a single BMD value averaged over a number of measurements. Thus, no variation of PTD has been investigated or is pointed to.

Presently, a new method is proposed that by quantifying trabecular homogeneity, as it appears on e.g. a radiograph of the distal forearm, an index of skeletal status may be provided.

Researchers have proposed a number of different ways to measure variations in radiographs that can be attributed to cancellous bone. Geraets et. al. (W. G. Geraets, P. F. Van der Stelt, C. J. Netelenbos and P. J. Elders, "A new method for automatic recognition of the radiographic trabecular pattern", J. Bone Miner. Res. 5(3), pp 227–233, March, 1990) proposed different textural measures estimated from a 10 mm×10 mm Region Of Interest (ROI), extracted close to the border of the former epiphysal growth plate. The extracted measures were correlated to wrist BMD, and moderate correlations were obtained. The inventor has not been able to obtain statistically significant correlations with biomechanical competence (of the hip), using this method. Weinstein et. al. (R. S. Weinstein and S. Majumdar, "Fractal geometry and vertebral compression fractures", J. Bone Miner.. Res., 9(11), Nov. 1994) and, Majumdar et. al. (S. Majumdar, R. S. Weinstein and R. R. Prasad, "Application of fractal geometry techniques to the study of trabecularbone", Med. Phys., 20(6), pp 1611–1619, November 1993) proposed applying a box counting algorithm for fractal analysis of the trabecular bone matrix.

Chung (H. W. Chung. C. C. Chung, M. Underweiser and F. W. Wehrli, "On the fractal nature of trabecular structure", Med. Phys., 21(10), pp 1535–1540, October 1994) investigated this method and concluded that the box counting algorithm is not suitable for fractal analysis of cancellous bone and continues to suggest that the fractal appearance of the trabecular network is artifactual. Benhamou et al. (C. L. Benhamou et al., "Fractal organization of trabecular bone images on calcaneous radiographs", J. Bone Miner. Res., 9(12), pp 1909–1918, December 1994) suggests that the surface may, in fact, be fractal, if it is not binarized. It is proposed to use a fractional gaussian noise model to obtain an estimate of the fractal dimension for a number of calcaneous images, and a high degree of reproducibility of this method is reported, although correlations to specific biomechanical properties are not reported in this paper.

Trippi et al. (D. Trippi, M. Chimenti and R. Bozzi, "A computer-assisted method for the study of the trabecular . . . ", J. Digit. Imaging, 6(2), pp 140–147, May 1993) propose measuring a coarseness index, based on image variance, on the forearm, and find a decrease in coarseness in the distal-proximal direction. The paper aims at defining a systematic way of selecting an ROI, and recommends measuring 6 to 12 mm from the former epiphysal growth plate.

SUMMARY OF THE INVENTION

According to the invention, it has been found that it is of limited use to look at one particular Region Of Interest. Instead, changes in the local variations, attributable to cancellous bone, must be quantified in order to obtain meaningful information about trabecular homogeneity. These findings also suggest that very strong correlations between BMD and measures of trabecular homogeneity may not exist, due to very fundamental differences in the nature of such measures. Finally, trabecular homogeneity measured on eg the forearm offers important independent information about biomechanical competence of the hip, that is not offered by any densitometric measures obtained on the appendicular skeleton.

Consequently, the present invention relates to a method for estimating the skeletal status of a vertebrate on the basis of two-dimensional image data comprising information relating to the trabecular structure of at least a part of a bone of the vertebrate, the image data being data obtained by exposing at least the part of the bone to electromagnetic radiation, the method comprising subjecting the image data to a statistical analysis comprising:

a background correction procedure in which low frequency intensity variations not related to the trabecular structure of the bone is reduced relative to image data related to the trabecular structure of the part of the bone, a feature extraction procedure comprising (a) determining values reflecting the projected trabecular density in the image data, caused by the X-ray attenuating properties of cancellous bone in the part of the bone, for each of a number of locations or areas in the image data, (b) deriving one or more features from the variation of the determined PTD-values, preferably in the longitudinal direction of the bone, and an estimation procedure in which the skeletal status of the vertebrate is estimated on the basis of the one or more derived features and optionally other features related to the bone of the vertebrate and a predetermined relationship between the features and reference skeletal status parameters.

As indicated above, in the present context "skeletal status" is not equalled to "bone quantity", such as Bone Mineral Density, as a loss of trabecular elements may lead to a disproportionate loss of biomechanical competence.

In fact, it is contemplated that a better estimate of skeletal status may be obtained by considering pertinent properties of cortical and cancellous bone individually instead of treating these two types of bones similarly, as it is done in standard densitometric methods.

The number of areas or positions may be any number higher than one. Normally, the fewer areas or positions, the more difficult will it be to provide a robust and reproducible method, as eg the extent to which the cancellous bone of a healthy individual extends away from the distal end of eg a distal radius may vary quite a lot. Therefore, it is preferred that the number of areas or positions is larger than 10, such as larger than 100, preferably larger than 500.

An X-ray image is a projection of the attenuating properties of the tissue in the direction of the X-ray radiation and is thus a projection of the 3-dimensional distribution of the X-ray attenuating properties of the cancellous tissue. The density of this projected structure yields a projected trabecular density. Thus, even though the bones and the trabecular structures thereof are inherently three-dimensional, the projection of this structure onto two dimensions, such as in a radiographic image, conveys useful information about the spatial distribution of cancellous bone.

It may be preferred to not only determine a single value for each location or area corresponding to local variation. In fact, two or more values reflecting different aspects of the projected trabecular density may be determined for each location or area.

Determining, evaluating, predicting or using the PTD at the locations or areas of the bone will, naturally, provide information relating to the trabecular homogeneity of the bone. As is contemplated in the present invention, this trabecular homogeneity reflects the skeletal status.

Low frequency intensity variations may be due to, e.g., scattering of the electromagnetic radiation, anatomic structures surrounding the illuminated part of the trabeculae such as cortical bone, fat tissue and muscles of varying thickness as well as, e.g., inhomogeneous X-ray illumination of the part of the bone. As these features are irrelevant to quantification of trabecular homogeneity, the low frequency intensity variations are preferably removed from the image data.

The features extracted from variations in the PTD-values are used for calibrating a model that describes any given reference variable relating to the skeletal status as previously described. Subsequently, the calibrated model may be used for predicting pertinent expressions of skeletal status for a given vertebrate.

As described above, bone quality or skeletal status is not equal to bone quantity in the present context, and the reference skeletal status parameters are preferably parameters related to the biomechanical competence of the bone, sensitivity, specificity or monitoring of treatment effects rather than, e.g., BMD or BMC.

However, to provide even higher diagnostic sensitivity, combination of the present invention with a measurement of BMC/BMD is contemplated to be useful. BMC/BMD measurements an be obtained either by the well-known single or dual wavelength absorptiometry technique or they may, if the image data are obtained on the basis of an X-ray image, be available from the same image data, where, e.g., a standard aluminum wedge has been illuminated together with the bone in question.

At present, the most common way of obtaining non-invasive information about the bone quantity and skeletal status is based on densitometric methods. According to the invention, the image data are preferably obtained for X-ray images. X-ray images may easily be used to generate the image data for use in the present invention. In order to be able to use image processing, an essentially analogue X-ray image is preferably digitized and introduced into a computer by scanning the X-ray image. Alternatively, methods using direct measurement of the X-rays may be used.

Naturally, it is preferred that the scanning of X-ray images is performed with a sufficiently large resolution and dynamic range in order to ensure that a minimum relevant information of the X-ray image is lost in the transfer to the image data. Thus, it is preferred that the scanning has been performed at a resolution of at least 4 pairs of lines per centimetre, such as at least 5 pairs of lines per centimetre. Even though this may be sufficient for obtaining a satisfactory estimation of the skeletal status, it is preferred that the resolution of the scanning of the X-ray film is at least 10 pairs of lines per centimetre, such as at least 25 pairs of lines per centimetre, preferably at least 50 pairs of lines per centimetre. It is possible to obtain resolutions in the scanning up to at least 100 pairs of lines per centimetre, such as at least 250 pairs of lines per centimetre and probably as high as 500 pairs of lines per centimetre, such as at least 600 pairs of lines per centimetre.

Furthermore, it is preferred that the resolution of the scanner is better than 4 true bits per pixel, such as better than 6 true bits per pixel, preferably better than 8 bits per pixel, such as better than 12 true bits per pixel, preferably better than 16 bits per pixel.

Naturally, in order to have the scanner actually scan the image, it should be able to transilluminate the radiographs.

The ESKOSCAN 2450 from Eskofot A/S has been found to fulfil the above criterias and to be highly suited for use in the method of the invention.

According to the invention, evaluating the homogeneity of the trabecular bone is performed by determining the local variation in density caused by variations in the cancellous bone composition resulting in a variation in the projected trabecular density seen in the image data at a number of locations or areas in the image data, preferably in a longitudinal direction of the bone. Subsequently, one or more features for use in the estimation procedure are derived from the PTD values.

Even though it is contemplated that the variation of PTD may be used in the present method for substantially all directions in the bone, especially that of the longitudinal direction is found interesting, and especially in long bones, such as the tibia, ulna, and the distal radius, where strong relations to other measures of skeletal status have been found.

In fact, it is contemplated that a large number of features derived from this variation of PTD in the longitudinal direction of the bone will provide a significant correlation with the failure load of e.g. the hip.

In order to facilitate the determination of the Regions Of Interest used in the bones and to enhance repeatability of the method, it is preferred that the PTD-values are determined at locations or areas situated longitudinally spaced apart within the bone. It is currently preferred that the locations or areas for which the PTD-values are determined are located at predetermined areas or positions in the image, such as along a reproducibly positionable curve in the image, preferably a substantially straight line substantially along a longitudinal axis of the bone.

The PTD-values may be determined in a number of ways, and they may be chosen to relate to different properties of the projected trabecular structure. At present, the PTD-value determined for each of the locations or areas is a value relating to first, second, third or higher order properties of the image data relating to the projected trabecular structure at the location or in the area in question.

Preferably, the PTD-values are calculated on the basis of a determination of any property of the Fourier power spectrum, a parametric spectral estimate or of the grey level co-occurrence matrix of information in the image data at the location or in the area in question, the variance of the image data at the location or in the area in question, or a mean value of the size and density of edges in the image data at the location or in the area in question.

Preferably, a PTD-profile is defined by the determined PTD values and a (preferably reproducible) measure relating to the positions of the areas or positions in relation to each other or in relation to a fixed position within the bone, such as, the determined PTD-values as a function of eg a distance from the location or area for which the individual PTD-value was determined to a predetermined reference point. In this situation, at least one of the above one or more features is derived from the profile. Features of this profile have been found to correlate especially well with parameters of skeletal status. Preferably, the predetermined reference point is also located on the line along which the PTD values are extracted, and preferably below the former epiphysal growth plate.

Thus, the PTD-profile preferably describes the PTD as a function of the distance between the area or position at which the individual value was derived and the predetermined reference point.

This profile has the advantage that reproducible information may be derived from all bones independently of the size and shape of the bone in question. Moreover, this type of measurement gives a global description of the skeletal status as opposed to measuring in a region of interest chosen more or less ad hoc.

If, as is preferred, the locations or areas for which the PTD-values are determined are situated between a former epiphysal growth plate of the bone and a second location within the bone at which the image data show substantially no projected trabecular structure, the profile will reflect a falling PTD, as the distance from the epiphysal growth plate increases.

It is of interest to consider a maximum and/or a minimum of the profile or a smoothed version thereof. Features may therefore also be derived from these measures.

The fluctuation or variation of the PTD-profile is also of interest. Therefore, one or more features are preferably derived from this fluctuation or variation. Such a feature may be derived from a polynomial fitted to the profile or from the standard deviation of the difference between the polynomial and the profile or a smoothed version thereof. In these situations, the polynomial is preferably of an order in the interval 1–10, such as 2–5, preferably 3–4.

In addition, a feature may be derived from a steepness of the profile, as this steepness may describe the decrease in trabecular bone from the epiphysal growth plate towards the center or middle of the bone.

An optional or additional feature may be derived from the standard deviation of a difference between the profile or a smoothed version thereof and a morphological opening or closing of the profile or of a smoothed version of the morphological phological opening or closing of the profile.

It is presently preferred that the background correction procedure comprises at least reducing or optionally removing low frequency information having a frequency significantly lower than the average spacing of the projected trabeculae. As described above, this low frequency content of the image data is typically caused by varying thickness of cortical bone, fat tissue and muscles of varying thickness as well as, e.g., inhomogeneous X-ray illumination of the part of the bone. Dual X-ray absorptiometry was invented to circumvent such problems relating to compensating for soft tissue. Also, other non-invasive image acquisition techniques, such as, e.g., MR and CT imaging may generate image data not automatically or not to the same degree "suffering from" this type of undesired effect.

Even though it is difficult to exactly quantify the limit between undesired low frequency information and the desired higher frequency relevant information independently of the image resolution, it is presently preferred that information having frequencies half or less than the average spacing of the projected trabeculae is at least reduced or optionally removed. More preferably, information having frequencies being a quarter or less, such as a tenth or less than the average spacing of the projected trabeculae is at least reduced or optionally removed.

One preferred way of reducing or preferably removing the low frequency information is using a background correction procedure comprising generating secondary image data as a result of performing a median filtering with a predetermined kernel size and subtracting this result from the original image data. One of the advantages of using a median filter is that this operation is edge preserving. This technique is known as "unsharp filtering".

Another way of reducing or preferably removing the low frequency information is using a background correction procedure comprising generating secondary image data as a result of performing a mean filtering with a predetermined kernel size and subtracting this result from the original image data. A mean filtering is typically much faster than the median filtering. However, the mean filtering is not edge preserving. Hence, the unsharp filtering may remove data we wish to include in the measurement.

It is typically preferred that the kernel size is at the most ½ of the image data, such as at the most ¼ of the image data, preferably at the most 1/10 of the image data, more preferably at the most 1/20 of the image data.

A third way of reducing or preferably removing the low frequency information is using a background correction procedure comprising globally fitting a two-dimensional polynomial to the image data and generating a background corrected image on the basis of the residuals of the fitting procedure. Apart from potential difficulties in determining the optimal order of the polynomial, which the person skilled in the art will know, this method potentially offers an extremely fast background correction of image data.

It is contemplated that a suitable order of the polynomial may be at the most 15, such as at the most 10, more preferably at the most 5.

Preferably, subsequent so the background correction procedure, the grey level distribution of the image data is standardized by performing a histogram stretch in order for the distribution to match a Gaussian. This step has the advantage that eg grey levels of different images may now be compared directly. This step is standard in image processing of this type.

Another method of background correcting the image data is one wherein the total absorption of the cortical bone in the bone is estimated at the different areas or locations and subtracted from the image data.

As bones, at the positions thereof comprising trabeculae, also comprise cortical bone, the total absorption thereof is a combination of the absorption of these two components. The below method has been devised for separating the two contributions. It is clear to the skilled person, that information relating to the cortical absorption in the image data will typically have a frequency lower than the information relating to the trabeculae.

Consequently, in a fourth embodiment, the background correction comprises:

(I) assessing, for each location or area, a value relating to the X-ray absorption caused by cortical bone, and (II) subtracting, for each location or area, the value of assessment (I) from the two-dimensional image data.

Preferably, this correction is performed on the raw image data as taken directly from a scanned X-ray image or directly from eg an X-ray detecting CCD.

Preferably, the assessment (I) is performed by:

(III) assessing the cortical thickness at one or more locations of one or more bones in the image data, (IV) assessing the absorption caused by the assessed thickness of cortical bone in the image data at the one or more locations, (V) for each area or position, assessing the thickness of cortical bone causing X-ray absorption, and (VI) assessing, for each location or area, a value relating to the X-ray absorption caused by cortical bone on the basis of the assessments (III), (IV), and (V).

Preferably, the absorption caused by the cortical bone is expressed as a mean value of grey levels at the position in question.

If eg an X-ray image is taken of a hand comprising both number of metacarpal bones and part of the distal radius, the Combined Cortical Thickness may be determined for a number of the metacarpal bones as well as at positions in the distal radius, where no trabeculae are present.

From these CCT measurements and the assumption that the cortical bone has the same thickness around the circumference of the bone at the longitudinal position thereof a relation may be determined which relates the absorption of the cortical bone to the thickness thereof. The respective absorption information may be derived from the image at the position where the X-rays have experienced the absorption of the CCT—that is at the same longitudinal position in the bone—in the middle of the bone.

This method has the advantage that, now, absorption data may be derived about the cortical bone (and on the basis thereof about the trabecular bone) which is independent of the manner in which the image was taken, developed, illuminated, scanned, etc—as long these properties are at least substantially the same over the surface of the scanned image.

This data may now be transferred to the part of the distal radius comprising trabeculae. Assuming again that the thickness of the cortical bone is substantially constant around the circumference of the bone (the distal radius), the thickness of the cortical bone as determined from the image data (in the same manner as used at the determination of the CCT) may be used in a determination of the absorption in the image relating to cortical bone and to trabecular bone.

Having determined the thickness and, using the above-determined graph or relation, the absorption of the cortical bone, the "deviation" therefrom may be assumed to relate to the absorption from the trabeculae. This absorption may be determined as a function of the position along the longitudinal position along the length of the bone or simply at predetermined positions or areas.

This calculated total absorption (or a related density predicted therefrom) may subsequently be used for deriving features for the quantitative determination of the skeletal status.

In addition to the above-mentioned features derivable from the image data, it may be preferred to input additional data relating to the vertebrate in question but which may not be derivable from the image data. This type of data may be information relating to the age and/or sex, and/or species, and/or race and/or the specific bone considered in the vertebrate, and/or a estimated Bone Mineral Density, and/or a estimated Bone Mineral Content.

Even though the DXA- or SXA-BMD determined using other equipment may be introduced in the estimation procedure, this measure may also optionally be determined from the image data. BMD is estimated by including data from a reference object in the exposure of the bone to the electromagnetic radiation and on the basis of the absorption of the electromagnetic radiation of the bone and of the reference object.

An especially preferred additional information to add to the features derived from the PTD-values is the thickness of the cortical bone of the same or another tubular bone of the vertebrate. Improved results are obtained, when indices relating to the thickness of the cortical shell of a bone, such as the Combined Cortical Thickness or a relative measurement as the Metacarpal Index, are used in the estimation procedure. This is due to the fact that the cortical and the trabecular bone tissue are thought to be metabolically different skeletal components which both contribute to the overall skeletal status. Quantifying both components will therefore most probably yield a more precise picture of the skeletal status.

The above-mentioned model may be determined in a number of ways. However, establishing a model of this type requires obtaining corresponding values of all relevant features and an end point variable relating to eg the biomechanical competence, the diagnostic sensitivity, specificity or accuracy in the diagnosis of osteoporosis which is to be estimated by the estimation procedure.

The system will require a calibration against suitable index of skeletal status. Examples of interesting skeletal status parameters are the biomechanical competence, and/or a Bone Mineral Density measurement, and/or a Bone Mineral Content measurement, and/or treatment effect and/or fracture incidence and/or a score value by a skilled radiologist. The method of the present invention will output a calibrated prediction of the chosen end point variable given a set of input variables: if the method is calibrated towards a strength parameter, the output of the method will relate to the strength of the bone in question.

It is expected that the present invention will be valuable in predicting the biomechanical competence through trabecular homogeneity and/or cortical thickness of the bone and/or improved sensitivity, specificity or accuracy in the diagnosis of osteoporosis.

As the calibration of the estimation procedure will reflect a predetermined relation between image features and skeletal status, this model should be chosen in a manner so that it correlates to the skeletal status. The assessment of the extent to which the embodiments of the present invention are able to estimate skeletal status may be performed by:

1. Prospective cohort-studies, in which odds ratio of any given type of fractures may be estimated for the given method,
2. case controlled studies, in which fracture cases and age-and-sex-matched controls are compared with respect to estimates to skeletal status obtained by the method according to the invention and optionally further to DXA-BMC measurements, or
3. by relating bio-mechanical strength of bone specimens to estimates of the skeletal status according to the invention and optionally additionally DXA-BMC-measurements of the bone in question.

Using either distal radius, fibula, tibia, ulna, a metacarpal, a phalanges, or any bone, preferably a long or a tubular bone, in which two-dimensional image data comprising information relating to the trabecular structure of the bone can be obtained, coherent values for determined bone strength, DXA-BMC and the estimate according to the present invention of the skeletal status of the vertebrate may be obtained on the basis of a calibration using eg human post-mortem bone samples or samples from other vertebrates.

The calibration of the method of the present invention may also be obtained along the above-illustrated methods as these methods generate skeletal status information and estimation on the basis of corresponding image data.

Bone strength may, e.g., be evaluated by directly measuring the plasticity and maximum load of a bone in a stress-strain diagram. (See, e.g., Lis Mosekilde). These parameters are preferably obtained in both the direction of the vertical trabeculae and in the orthogonal direction in order to have the most complete estimate of the skeletal status. However, the presently preferred manner of evaluating bone strength is using a setup determining the fracture load of the proximal femur and being designed to simulate a fall to the side of the individual.

In the method of the invention, substantially all types of models may be used for relating the chosen end point variables to a set of explanatory variables. At present, a preferred model is selected from the group consisting of: a General Linear Model, a Generalized Linear Model, an Artificial Neural Network, a Causal Probabilistic Net or Classification And Regression Trees.

As described above, the present method may be used to determine aspects of the skeletal status of any vertebrate. Thus, the vertebrate may be a human, a horse, a great ape, a large ape, an anthropoid ape, a pig, a cow, etc., and the actual bone is preferably a tubular bone, such as a bone chosen from the group consisting of: radius, ulna, tibia, fibula, metacarpal, phalanges, and femur. Especially bones comprising a tube (diaphysis) and at least at one end an epiphysis comprising trabecular bone are suitable for use in the present method.

BRIEF DESCRIPTION OF THE DRAWINGS

In the following, preferred embodiments of the method of the invention are described in the form of examples and with reference to the figures, wherein.

DETAILED DESCRIPTION OF THE INVENTION

EXAMPLE 1

Evaluation of the Method by Separating Normal and Osteoporotic Persons

Data 28 women: 9 young normal women (group 1), 9 normal postmenopausal women (group 2) and 10 women with spinal BMD<2.5SD (T-score) and with an osteoporotic fracture (group 3) were studied.

Of these women, Bone Mineral Density (BMD) of the proximal femur, lumbar spine and forearm were determined using dual x-ray absorptiometry (DXA). A non-screen radiograph (50 kV/20 mAs) was used for the image analysis procedure. The x-rays were digitized at 600 lines/cm using a commercially available scanner (Eskoscan model 2540, Eskofot, Denmark).

Methods

Cortical thickness measured on metacarpal bones

Figure 1:
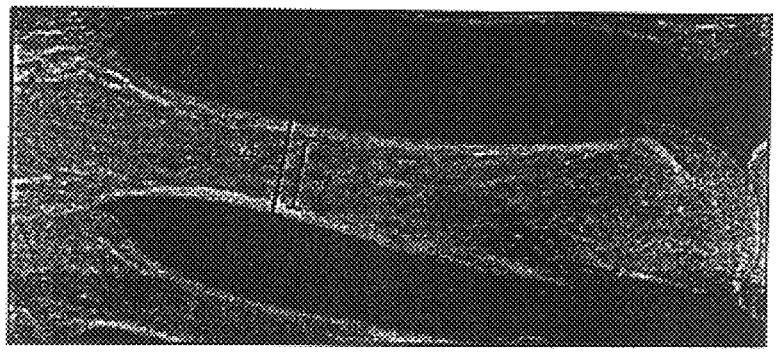
FIG. 1 illustrates the measurement of the Combined Cortical Thickness (CCT) as L1–L2.

The combined cortical thickness, CCT, has been investigated by researchers (e.g. M. Fukunaga et al., "Indexes of bone mineral content . . . ", Radiation Medicine, 8(6), pp 230–235, November–December 1990) as a measure of the cortical component of the skeleton and as a predictor of fracture incidence. In the present study, significant correlations with densitometric measurements such as DXA-BMD, particularly on the distal forearm, were, in fact, found. CCT, as illustrated in FIG. 1, was measured for the third metacarpal bone.

The Trabecular Index

It is known that the thickness of the cancellous portion of bone in the radius decreases in the distal to proximal direction whereas the cortical bone grows thicker until little or no cancellous bone is found. Geraets et. al. (W. G. Geraets, P. F. Van der Stelt, C. J. Netelenbos and P. J. Elders, "A new method for automatic recognition of the radiographic trabecular pattern", J. Bone Miner. Res. 5(3), pp 227–233, March, 1990) claims that the trabecular pattern on radiographs on the radius originates exclusively from the bone structure in the transitional region of cortical and cancellous bone. In distal forearm radiographs, a high density of projected trabecular patterns (shadows) is seen in the ultra distal end of the radius. This density decreases in the proximal direction. It is not completely clear whether this is due to decreasing thickness of cancellous bone or just a decreasing amount of trabecular structures in the transitional region as referred to by Geraets et. al. Consequently, it is assumed that both phenomena are contributing to the changes in local variability due to trabecular structures. If, for the sake of the argument, it is assumed that the physical density of trabecular elements in the cancellous portion of the bone is fairly homogeneous, the density of projected trabecular patterns observed on the radiographic film should decrease more or less proportionally to the decreasing amount of cancellous bone. If however, due to accelerated bone loss, portions of the trabecular bone has been lost, the decrease in projected trabecular density will be far less significant than for normal, homogeneous trabecular bone. One would also expect the projected trabecular density to decrease in a less smooth way than for homogenous cancellous bone.

Obviously, projected trabecular density relates to local variations in the grey levels of the image, which can be quantified in many different ways. The inventor has tested several such methods including local variance, smoothing of local edges (which may be found by a multitude of different edge detection techniques), Grey Level Co-occurrence Techniques and a number of features measured on local Fourier spectra. It was found that all of these techniques perform comparably, which is not surprising since they basically measure the same phenomenon: local variation in grey levels due to projected trabecular elements. At present, a local Fourier method is preferred, as described below.

Algorithm 1

Figure 2:
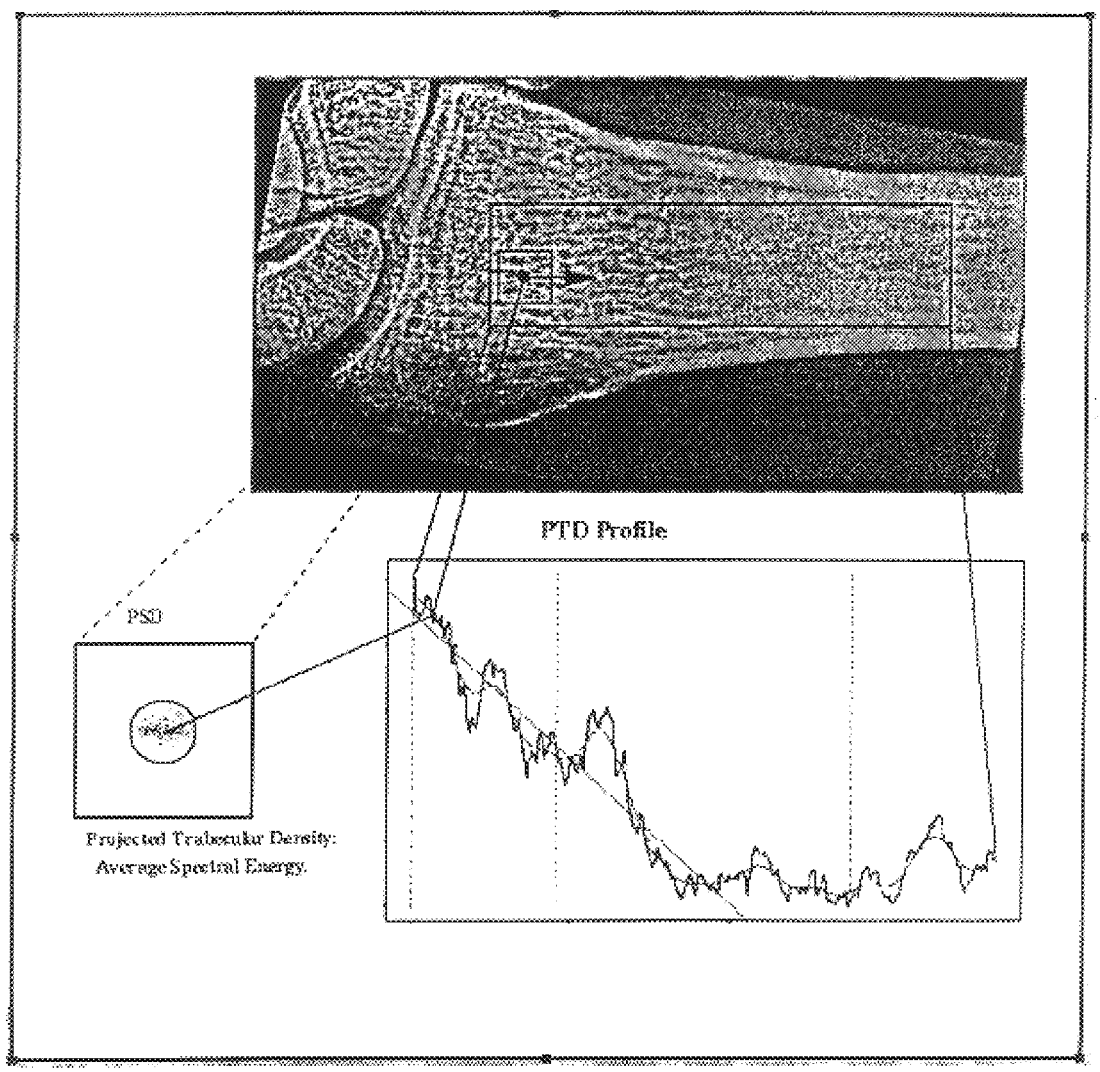
FIG. 2 illustrates the rotation of the radius to be aligned in the distal-proximal direction. Using a Fourier approach, the Projected Trabecular Density is calculated locally with the main axis along this direction, and plotted versus the distance from the epiphysal growth plate, as outlined by the left vertical line. This produces the so-called PTD-profile.

1. Low-frequency variations attributable to varying thickness in the cortical bone and soft tissues, are removed by applying unsharp filtering, which is implemented by subtracting an M×M median filtered version of the image from itself, where M is large compared to the trabecular structures.
2. Rotate the image obtained above, such that the radius is aligned as precisely as possible in the distal-proximal direction, as shown in FIG. 2.
3. Extract a Region Of Interest which is $N_c$ pixels wide, starting right under the former epiphysal growth plate, extending $N_r$ pixels down in the proximal direction, just below the portion of cancellous bone, as shown in FIG. 2. Perform a histogram match of the grey levels to a gaussian (as described in e.g. J. M. Carstensen, "Description and Simulation of visual texture", PhD. Thesis, Technical University of Denmark, IMM, Bldg. 321, DK-2800 Lyngby, Denmark, 1992).
4. Extract N×N regions (N being a power of two), in the longitudinal direction, equidistantly spaced by $\Delta_r$ pixels (e.g. $\Delta_r=1$), and subtract the average grey level value from each of the extracted regions (thus eliminating the DC value).
5. For each extracted N×N region, the Fourier power spectrum is calculated, and the average energy in a centered circle in calculated. The radius of this circle is chosen to be 0.25 in spatial frequency. This principle is illustrated in FIG. 2.

For each sub-window, a measure is thus obtained of the average energy of the Fourier power spectrum. This energy is measured only over frequencies that are directly associated with the projected trabeculae, and is thus a measure closely related to projected trabecular density. If the projected trabecular density (PTD) of a given window is plotted as a function of its distance (e.g. in pixels) from the former epiphysal growth plate, what is referred to as the PTD-profile is obtained, as shown in FIG. 2.

Figure 3:
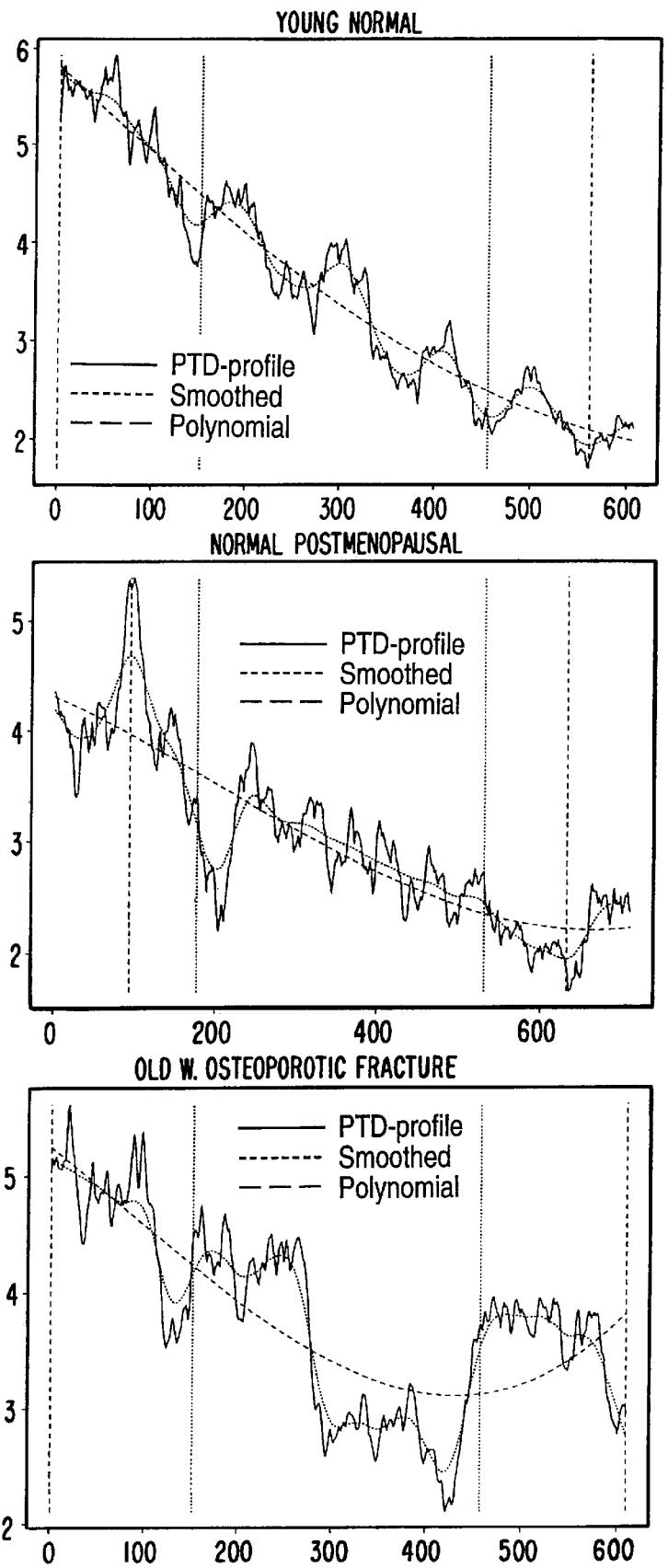
FIG. 3 illustrates the PTD-profiles for a young normal, a normal postmenopausal and an old osteoporotic woman (with fracture). Note how the curve fluctuates a lot more as trabecular bone (presumably) is lost. Also the difference between maximum- and minimum PTD becomes smaller (at least compared to the total variability).

For a dense and homogeneous trabecular structure, the PTD-profile decreases smoothly in the proximal direction, until the variations become fairly small and primarily become due to variations in the cortical thickness. It should be noted that the variation in cortical thickness might be expected to grow markedly in osteoporotic individuals, which may contribute to a more jagged appearance of the PTD-profile for osteopenic and osteoporotic patients. For a sparse and inhomogeneous trabecular structure, the decrease in projected trabecular density is more modest, since the projected trabecular density is correspondingly lower for the cancellous portion of the bone. In this case, the fluctuations become very pronounced due to trabecular inhomogeneity. These phenomena appear to be varying continuously between two such extremes given by young healthy and old osteoporotic persons, as illustrated in FIG. 3. In summary, two indicators are given: 1) The ratio of minimum to maximum in the PTD-profile, $T_{rel}$, and 2) The variability of the PTD-profile, $T_o$.

The ratio of minimum to maximum of the PTD-profile, $T_{rel}$, may be determined in a number of different ways. Presently, the following approach is preferred:

Algorithm 2

1. The PTD-profile is smoothed using a robust locally weighted regression and smoothing technique as described by Cleveland (W. S. Cleveland, "Robust locally weighted regression and smoothing scatterplots", J. Am. Stat. Ass., 74(368), pp 829–836, 1979).
2. Due to the way the ROI was extracted, the maximum of the projected trabecular density should be within the first w % of the profile (say 25%), and the minimum should be within the last w %. The maximum, $T_{max}$, and minimum, $T_{min}$, are located in these two intervals respectively, as shown in FIG. 3, on the smoothed profile.
3. $T_{rel}=T_{min}/T_{max}$ The fluctuations of the PTD-profile are determined as the variation around a third-order polynomial which is fitted to the smoothed profile:

$$P(r)=a_3r^3+a_2r^2+a_1r+a_0$$

using a simple Least Squares fit. Of course, one might consider using a robust estimator. Whether this is necessary or not will depend on results obtained on a larger, or more varied, data set. In FIG. 3, the fitted polynomials are shown with the respective PTD-profiles. Obviously, the application of such a polynomial is somewhat arbitrary, but is dictated by one crucial requirement: In order to meaningfully describe the fluctuations of the PTD-profile, it is necessary to fit a relatively "stiff" curve which is also able to follow the global variations typically found for such a profile, i.e. a relatively flat maximum followed by an almost linear decrease and a relatively flat minimum (at least for the non-osteoporotic persons). This allows for a meaningful characterization of the fluctuation as the residual standard deviation, where $$T_\sigma = \sqrt{\frac{1}{N-1}\sum_{R=1}^{N}(y_r - P(r))^2}$$

N is the number of data points in the PTD-profile, and $y_r$ are points on the smoothed PTD-profile. The Trabecular Index is now-proposed:

$$T_x = T_{rel} T_\sigma$$

as a measure of trabecular homogeneity. As the trabecular homogeneity decreases, both $T_{rel}$ and $T_\sigma$, and therefore also the product, increase.

Results and Conclusion

In the previous section, two essentially different components for assessing skeletal "quality" were discussed which, in this context, is taken to mean biomechanical competence of the hip.

Figure 4:
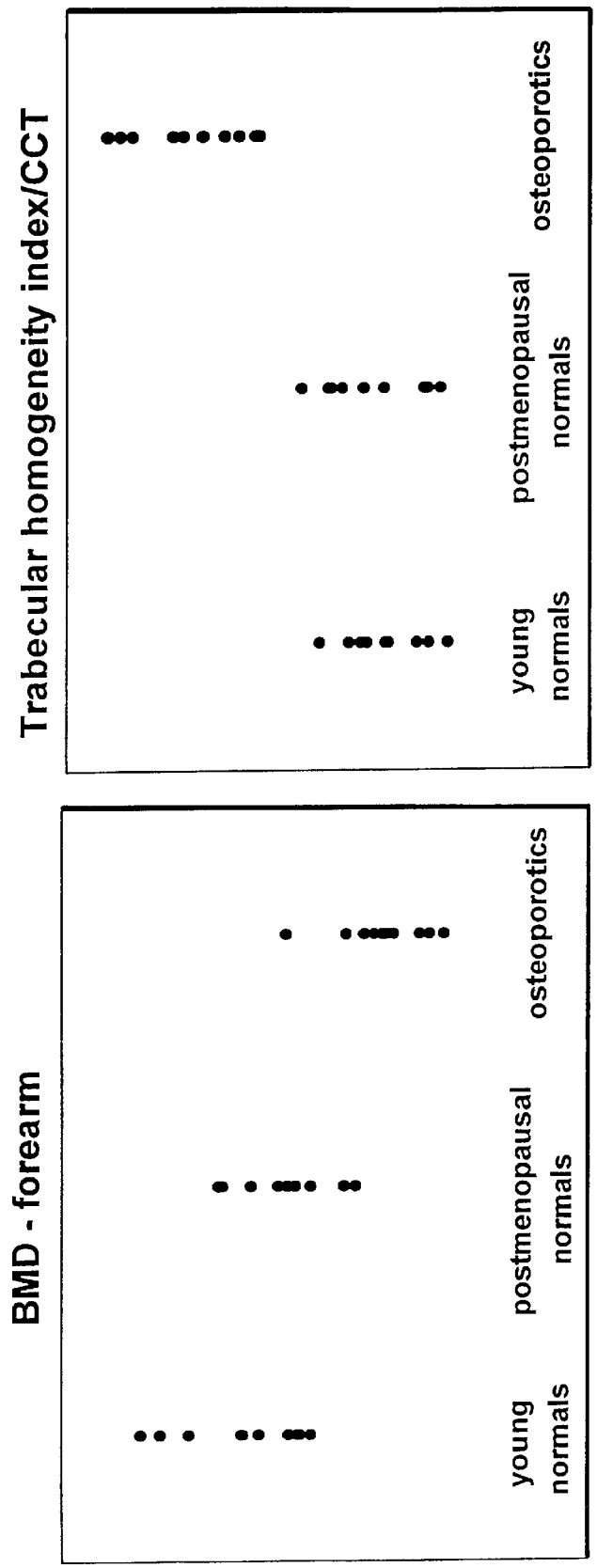
FIG. 4 illustrates the overlap of readouts of hand BMD measurements (left) and of the method of the invention (right).

From the left part of FIG. 4, it may be seen that a large overlap is present between the BMD readouts of the forearm measurements between groups 1, 2 and 3. This is unwanted, as this will give an uncertainty in the diagnosis.

However, from the right part of FIG. 4 it may be seen that this disadvantage has been greatly overcomed by the present invention in that the readings from groups 1 and 2 differ greatly from those of group 3.

It was found that Tx/CCT was significantly correlated to BMD at the distal forearm, hip and lumbar spine (r=0.78, p<0.0001; r=0.66, p<0.001; r=0.71, p<0.0001).

Therefore, using conventional X-ray of the distal forearm and hand, information on fracture risk can be obtained. The Tx/CCT feature seems to give a better separation of normal and osteoporotic persons than BMD.

EXAMPLE 2

Another Preferred Embodiment

Another method of deriving features from the graph defined by the PTD values may be to calculate the morphological opening or closing of the graph or of a smoothed version thereof and to subsequently derive the standard deviation between those two graphs. From this standard deviation, information relating to the skeletal status may be derived.

Using the following notation
* PTD:
  Original PTD-profile
* smooth(x,wsiz):
  A function that smooths the profile, x, with a moving average of size wsiz
* open(x, struc, ntim):
  A function that performs a morphological opening of the profile x using a structural element of the size struc. The opening is performed as ntim erosions followed by ntim dilations, using the structural element specified.
* close(x, struc, ntim):
  A function that performs a morphological closing of the profile x using a structural element of the size struc. The opening is performed as ntim dilations followed by ntim erosions, using the structural element specified.

The fluctuation may then be estimated by calculating the standard deviation of the following data:
1) PTD—open(PTD, struct, ntim)
2) PTD—open(smooth(PTD,wsiz), struct, ntim)
3) smooth(PTD, wsiz)—open(smooth(PTD,wsiz), struct, ntim)
4) smooth(PTD, wsiz)—open(PTD, struct, ntim)
5) PTD—close(PTD, struct, ntim)
6) PTD—close(smooth(PTD,wsiz), struct, ntim)
7) smooth(PTD, wsiz)—close(smooth(PTD,wsiz), struct, ntim)
8) smooth(PTD, wsiz)—close(PTD, struct, ntim)

At present, the following parameters were chosen: struct=5, ntim-20 and wsiz=75. However, this method is fairly robust to the choice of parameters.

Using the present method, it is contemplated that correlations not using CCT may be as high as 0.80 or higher to femoral failure load and even higher using CCT.

EXAMPLE 3

A Third Preferred Embodiment

In this example, an embodiment of a background correction is described wherein information relating to the absorption of cortical bone is obtained for the area wherein the PTD profile is determined. This information may be used for subtracting information relating to the absorption of cortical bone from the image data and, thus, for generating information relating to the absorption of the trabecullar bone in the same area.

Figure 5:
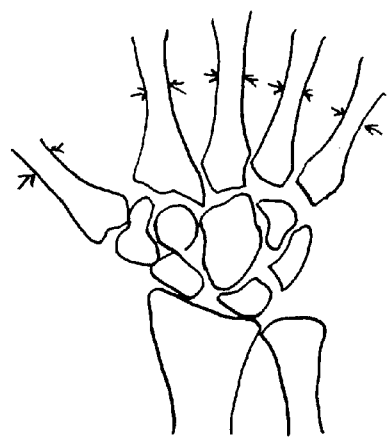
FIG. 5 illustrates a hand radiograph wherein the positions of determining the CCT (four metacarpal bones and the distal radius) are illustrated.

In FIG. 5, a hand radiograph is illustrated wherein the positions of determining the CCT (four metacarpal bones and the distal radius) are illustrated. From these assessed thicknesses and the absorption caused thereby, as determined from the image data, a relation of cortical thickness and caused absorption may be derived. The absorption caused by the determined thickness of cortical bone is preferably determined at the part of the bone where it is the narrowest and at center of the bone at the position in question.

Figure 6:
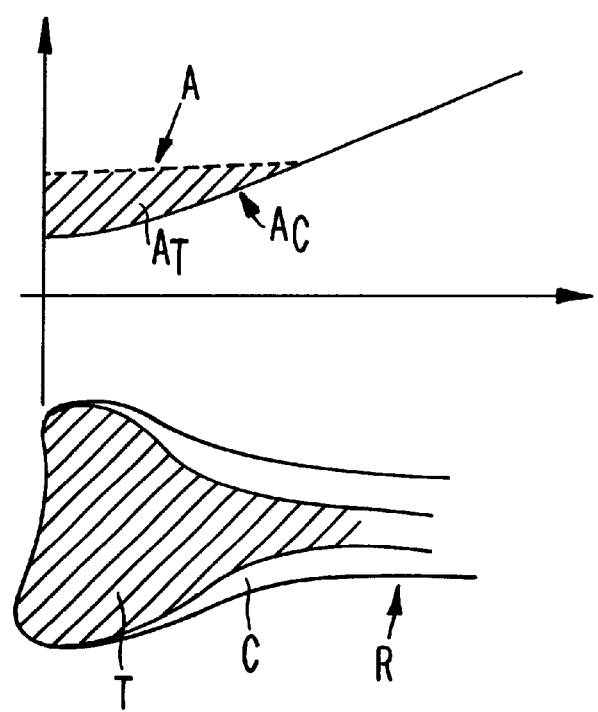
FIG. 6 illustrates the distal radius together with a graph illustrating the overall absorption thereof as determined as the absorption integrated over the width of the bone. In addition, the cortical bone of the distal radius is illustrated as is the predicted absorption thereof in the graph.

In FIG. 6, the distal radius R is illustrated wherein the cortical bone C and the trabecular bone T may be seen. Also shown in a graph illustrating the overall absorption ($A_O$) of the distal radius (again determined as an integration over the width of the bone) along the length of the bone, the absorption expected from the thickness of cortical bone ($A_C$) at the different locations and the predicted absorption ($A_C$) relating to trabecular bone.

From the graph of FIG. 6, the predicted absorption $A_T$ of the trabecular bone may be derived and used in the quantitative assessment of the skeletal status.

Presently, it is contemplated that the features described above in examples 1 and 2 are equally well suited using the graph derivable from FIG. 6.

What is claimed is:

1. A method for estimating the bone quality or skeletal status of a vertebrate on the basis of two-dimensional image data comprising information relating to the trabecular structure of at least a part of a bone of the vertebrate, the image data being data obtained by exposing at least the part of the bone to electromagnetic radiation, the method comprising subjecting the image data to a statistical analysis comprising
    a background correction procedure in which low frequency intensity variations not related to the trabecular structure of the bone is reduced relative to image data related to the trabecular structure of the part of the bone, a feature extraction procedure comprising (a) determining values reflecting the projected trabecular density in the image data, caused by the x-ray attenuating properties of cancellous bone in the part of the bone, for each of the number of locations or areas in the image data, (b) deriving one or more features from the variation of the determined PTD-values, preferably in the longitudinal direction of the bone, and an estimation procedure in which the bone quality or skeletal status of the vertebrate is estimated on the basis of the one or more derived features and optionally other features related to the bone of the vertebrate and a predetermined relationship between the features and reference skeletal status parameters and wherein a PTD-profile is defined by the determined PTD-values and a distance from the location or area for which the individual PTD-value was determined to a predetermined point, and wherein at least one of the one or more features are derived from the profile.

2. A method according to claim 1, wherein an other feature is derived from the thickness of the cortical bone of the same or another tubular bone of the vertebrate.

3. A method according to claim 1, wherein the PTD-values are determined at locations or areas situated longitudinally spaced apart within the bone.

4. A method according to claim 3, wherein the locations or areas for which the PTD-values are determined are located along a substantially straight line substantially along a longitudinal axis of the bone.

5. A method according to claim 1, wherein the predetermined point is located on the line.

6. A method according to claim 1, wherein the locations or areas for which the PTD-values are determined are situated between a former epiphysal growth plate of the bone and a second location within the bone at which the image data show substantially no projected trabecular structure.

7. A method according to claim 1, wherein the PTD-value determined for each of the locations or areas is a value relating to first, second, third or higher order properties of the image data relating to the projected trabecular structure at the location or in the area in question.

8. A method according to claim 1, wherein the PTD-values are calculated on the basis of a determination of any property of the Fourier power spectrum, a parametric spectral estimate or of the grey level co-occurrence matrix of information in the image data at the location or in the area in question, the variance of information in the image data at the location or in the area in question, or a mean value of the size and density of edges in the image data at the location or in the area in question.

9. A method according to claim 4, wherein a feature is derived from a maximum of the profile or a smoothed version thereof.

10. A method according to claim 4, wherein a feature is derived from a minimum of the profile or a smoothed version thereof.

11. A method according to claim 4, wherein a feature is derived from a polynomial fitted to the profile.

12. A method according to claim 10, wherein the feature is derived from the standard deviation of the difference between the polynomial and the profile or a smoothed version thereof.

13. A method according to claim 10, wherein the polynomial is of an order in the interval 1–10, such as 2–5, preferably 3–4.

14. A method according to claim 4, wherein a feature is derived from a steepness of the profile.

15. A method according to claim 4, wherein a feature is derived from fluctuation of the profile.

16. A method according to claim 4, wherein a feature is derived from the standard deviation of a difference between the profile or a smoothed version thereof and a morphological opening or closing of the profile or of a smoothed version of the morphological opening or closing of the profile.

17. A method according to claim 1, wherein the background correction procedure comprises at least reducing or optionally removing low frequency information having a frequency significantly lower than the average spacing of the projected trabeculae.

18. A method according to claim 16, wherein information having frequencies half or less than the average spacing of the projected trabeculae is at least reduced or optionally removed.

19. A method according to claim 17, wherein information having frequencies being a quarter or less than the average spacing of the projected trabeculae is at least reduced or optionally removed.

20. A method according to claim 18, wherein information having frequencies being a tenth or less the average spacing of the projected trabeculae is at least reduced or optionally removed.

21. A method according to claim 17, wherein the background correction procedure comprises generating secondary image data as a result of performing a median filtering with a predetermined kernel size and subtracting this result from the original image data.

22. A method according to claim 17, wherein the background correction procedure comprises generating secondary image data as a result of performing a mean filtering with a predetermined kernel size and subtracting this result from the original image data.

23. A method according to claim 17, wherein the background correction procedure comprises globally fitting a two-dimensional polynomial to the image data and generating background corrected image data on the basis of the residuals of the fitting procedure.

24. A method according to claim 22, wherein the order of the polynomial is at the most 15, such as at the most 10, preferably at the most 5.

25. A method according to claim 20, wherein the kernel size is at the most ½ of the image data, such as at the most ¼ of the image data, preferably at the most ¹⁄₁₀ of the image data, more preferably at the most ¹⁄₂₀ of the image data.

26. A method according to claim 1, wherein the background correction procedure comprises:

(I) assessing, for each location or area, a value relating to the X-ray absorption caused by cortical bone, (II) subtracting, for each location or area, the value from the assessment (I) from the image data.

27. A method according to claim 25, wherein the assessment (I) is performed by:

(III) assessing the cortical thickness of one or more bones in the image data, (IV) assessing the absorption caused by the assessed thickness of cortical bone in the image data, (V) for each area or position, assessing the thickness of cortical bone causing X-ray absorption, and (VI) assessing, for each location or area, a value relating to the X-ray absorption caused by cortical bone on the basis of the assessments (III), (IV), and (V).

28. A method according to claim 1, wherein at least one feature is related to the bone or to the vertebrate, such as age and/or sex, and/or species, and/or race and/or the specific bone considered in the vertebrate, and/or an estimated Bone Mineral Density of the bone, and/or an estimated Bone Mineral Content of the bone, is included in the estimation procedure.

29. A method according to claim 27, wherein the at least one feature is related to an estimated Bone Mineral Density of the bone and wherein the Bone Mineral Density is estimated by including data from a reference object in the exposure of the bone to the electromagnetic radiation and where the Bone Mineral Density is estimated by correlating the absorption of the electromagnetic radiation of the bone and of the reference object.

30. A method according to claim 1, wherein the estimation procedure is based on a statistical model, taking into account the correlation structure in the data set, so as to assign appropriate weights to the significant features in accordance with the predetermined relationship.

31. A method according to claim 1, wherein the reference skeletal status is an absolute or relative bone quality of bones.

32. A method according to claim 30, wherein the reference skeletal status is determined on the basis of measurement of the mechanical bone strength, and/or Bone Mineral Density measurement, and/or on the basis of a Bone Mineral Content measurement, and/or on the basis of a score of the bone strength by a skilled radiologist.

33. A method according to claim 1, wherein the predetermined relationship between the features and reference skeletal status parameters is established on the basis of reference skeletal status parameters and features extracted according to any of the preceding claims.

34. A method according to claim 32, wherein the predetermined relationship is defined in terms of a model taken from the group consisting of: a General Linear Model, a Generalized Linear Model, an Artificial Neural Network, a Causal Probabilistic Net and Classification And Regression Trees.

35. A method according to claim 1, wherein the vertebrate is a human, a horse, a large ape, a great ape, an anthropoid ape, a pig or a cow.

36. A method according to claim 1, wherein the bone is a tubular bone, such as a bone chosen from the group consisting of: radius, ulna, tibia, fibula, metacarpal, phalanges and femur.

37. A method according to claim 1, wherein the bone is a bone comprising a tube (diaphysis) and at least at one end an epiphysis comprising trabecular bone.

* * * * *

UNITED STATES PATENT AND TRADEMARK OFFICE
CERTIFICATE OF CORRECTION

PATENT NO. : 6,411,729 B1
DATED : June 25, 2002
INVENTOR(S) : Michael Grunkin

It is certified that error appears in the above-identified patent and that said Letters Patent is hereby corrected as shown below:

Column 15,
Lines 61 and 65, please change "10" to -- 11 --.

Column 16,
Line 14, please change "16" to -- 17 --.
Line 18, please change "17" to -- 18 --.
Line 23, please change "18" to -- 19 --.
Line 42, please change "22" to -- 23 --.
Line 45, please change "20" to -- 21 --.
Line 55, please change "25" to -- 26 --.

Column 17,
Line 6, please change "27" to -- 28 --.
Line 22, please change "30" to -- 31 --.

Column 18,
Line 8, please change "32" to -- 33 --.

Signed and Sealed this

Fifth Day of October, 2004

JON W. DUDAS
*Director of the United States Patent and Trademark Office*